(12) United States Patent
Akaki et al.

(10) Patent No.: US 8,165,738 B2
(45) Date of Patent: Apr. 24, 2012

(54) INDUSTRIAL VEHICLE AND POWER CONTROL METHOD FOR THE SAME

(75) Inventors: Tomohiro Akaki, Takasago (JP);
Kensuke Futahashi, Takasago (JP);
Takaharu Hiroe, Takasago (JP);
Kiyomitsu Ogawa, Sagamihara (JP);
Yoshimi Okazaki, Sagamihara (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 1046 days.

(21) Appl. No.: 11/976,903

(22) Filed: Oct. 29, 2007

(65) Prior Publication Data

US 2008/0133077 A1 Jun. 5, 2008

(30) Foreign Application Priority Data

Nov. 9, 2006 (JP) ................................. 2006-303781

(51) Int. Cl.
*B66F 9/06* (2006.01)

(52) U.S. Cl. ................. 701/22; 701/50; 701/51; 701/54; 701/55; 701/56; 701/99; 180/53.1; 187/222; 187/224; 187/393; 187/394

(58) Field of Classification Search ........ 180/65.1–65.3; 187/222–238, 250–277, 393, 394; 701/1, 701/22, 50–69
See application file for complete search history.

(56) References Cited

U.S. PATENT DOCUMENTS

| | | | | |
|---|---|---|---|---|
| 5,505,043 A | * | 4/1996 | Baginski et al. | 60/477 |
| 6,413,185 B1 | * | 7/2002 | Baginski et al. | 475/208 |
| 6,566,826 B2 | * | 5/2003 | Imai et al. | 318/11 |
| 6,569,055 B2 | * | 5/2003 | Urasawa et al. | 477/5 |
| 6,589,130 B1 | * | 7/2003 | Baginski et al. | 477/3 |
| 7,143,859 B2 | * | 12/2006 | Ohtsukasa | 180/307 |
| 7,261,170 B2 | * | 8/2007 | Leifert | 180/65.31 |
| 7,770,697 B2 | * | 8/2010 | Futahashi et al. | 187/224 |
| 2001/0030085 A1 | * | 10/2001 | Nagata et al. | 187/222 |
| 2002/0148144 A1 | * | 10/2002 | Tokunaga | 37/348 |
| 2002/0189397 A1 | * | 12/2002 | Sakamoto et al. | 74/661 |
| 2004/0058769 A1 | * | 3/2004 | Larkin | 475/5 |
| 2004/0097316 A1 | * | 5/2004 | Misu | 475/5 |
| 2004/0124020 A1 | * | 7/2004 | Leifert | 180/65.1 |
| 2005/0036894 A1 | * | 2/2005 | Oguri | 417/212 |

(Continued)

FOREIGN PATENT DOCUMENTS

DE 19930793 A1 1/2001

(Continued)

*Primary Examiner* — Jonathan M Dager
(74) *Attorney, Agent, or Firm* — Birch, Stewart, Kolasch & Birch, LLP

(57) ABSTRACT

An industrial vehicle having a hybrid system controls a distribution of power generated by an engine and power generated by an electric motor. The vehicle includes an engine for supplying power to one of a running unit and a loading-and-unloading unit; a first motor for supplying power to one of the running unit and the loading-and-unloading unit; a second motor for supplying power to the running unit; a required-power calculating unit for calculating running power, and loading-and-unloading power; a clutch unit for controlling the power transmitted from the engine to the running unit; and a power-distribution calculating unit for selecting a destination to be supplied with power from the engine and the first motor based on the control status of the clutch unit, and for calculating a distribution of power which the engine, the first motor, and the second motor supply based on the calculating running power and loading-and-unloading power.

5 Claims, 9 Drawing Sheets

U.S. PATENT DOCUMENTS

2006/0243260 A1* 11/2006 Ichijo et al. ............... 123/559.3
2007/0080236 A1*  4/2007 Betz et al. ................... 237/12.1
2007/0095587 A1*  5/2007 DuCharme ................. 180/65.3
2007/0191180 A1*  8/2007 Yang ................................ 477/5

FOREIGN PATENT DOCUMENTS

| | | |
|---|---|---|
| EP | 0911546 A1 | 4/1999 |
| EP | 1707418 A2 | 4/2006 |
| JP | 2000-313600 A | 11/2000 |
| JP | 2003-250203 A | 9/2003 |
| JP | 2005-297590 A | 10/2005 |
| JP | 2006-273513 A | 10/2006 |
| JP | 2006-273514 A | 10/2006 |
| JP | 2006-273515 A | 10/2006 |
| JP | 2006-273516 A | 10/2006 |
| JP | 2006-273517 A | 10/2006 |

\* cited by examiner

INDUSTRIAL VEHICLE AND POWER CONTROL METHOD FOR THE SAME

This application is based on Japanese Patent Application No. 2006-303781, the content of which is incorporated herein by reference.

BACKGROUND OF THE INVENTION

1. Field of the Invention

The present invention relates to industrial vehicles and to a method for controlling power of the same.

2. Description of Related Art

Conventional forklift trucks use a single engine as a driving source for a loading-and-unloading system and a running system. Accordingly, because an engine having high-output is used, there is a problem of poor fuel efficiency and an increased amount of exhaust gas when the rotation speed of the engine is low.

When a low-output engine is used to address this problem, the method of use thereof is limited in that, for example, it is necessary to separate the running system or the loading-and-unloading system from the engine when the load is high.

In order to overcome these problems, a so-called hybrid system combining an engine and a motor generator has been proposed (for example, see Japanese Unexamined Patent Applications, Publication Nos. 2003-250203 and 2000-313600).

Hybrid systems include series systems that supply power to a running system and a loading-and-unloading system by generating electrical power from a generator rotationally driven by an engine and supplying the obtained electrical power to an electric motor; and parallel systems that supply at least a part of the engine power, as well as power from the electric motor, to the running system and the loading-and-unloading system.

Japanese Unexamined Patent Application, Publication No. 2003-250203 discloses hybrid industrial vehicles for loading and unloading configured to supply power to a running system using a series system, and to a loading-and-unloading system using a parallel system. Japanese Unexamined Patent Application, Publication No. 2000-313600 discloses running vehicles having a loading-and-unloading function configured to supply power to a running system and a loading-and-unloading system using a series system.

In the above method of supplying power using the parallel system, the total power generated from the engine and the electric motor is equal to the total power supplied to the running system and the loading-and-unloading system (power balance is satisfied). The ratio of power generated by the engine to power generated by the electric motor is usually determined by a torque distribution to the engine and the electric motor.

However, a rotation speed of the engine and a rotation speed of the electric motor arbitrarily change with the torque distribution, and rotation speeds of the engine and the electric motor, as well as the torque, are also variables. Therefore, it is complicated to perform control involving many variables for setting the torque so as to satisfy the engine power balance.

The present invention has been conceived to solve the above-described problems, and an object thereof is to provide an industrial vehicle having a hybrid system capable of readily controlling a distribution of power generated by an engine and power generated by an electric motor, and a method of controlling the power of the same.

SUMMARY OF THE INVENTION

In order to realize the object described above, the present invention provides the following solutions.

A first aspect of the present invention is an industrial vehicle comprising an engine configured to supply power to one of a running unit for running and a loading-and-unloading unit for loading and unloading; a first motor configured to supply power to one of the running unit and the loading-and-unloading unit; a second motor configured to supply power to the running unit; a required-power calculating unit configured to calculate running power required by the running unit, and loading-and-unloading power required by the loading-and-unloading unit; a clutch unit configured to control the power transmitted from the engine to the running unit; and a power-distribution calculating unit configured to select a destination to be supplied with power form the engine and the first motor based on the control status of the clutch unit and to calculate a distribution of power which the engine, the first motor, and the second motor supply based on the calculated running power and loading-and-unloading power.

According to the first aspect of the present invention, because the power-distribution calculating unit calculates three variables, that is, power which the engine supplies, power which the first motor supplies, and power which the second motor supplies, so as to satisfy the total of running power and loading-and-unloading power, the number of variables can be reduced compared to a distribution method based on torque distribution using many variables. Accordingly, the distribution control can be simplified.

The destination to be supplied with power from the engine and the first-motor power is selected as either the running unit or the loading-and-unloading unit based on the control status of the clutch unit, thus further simplifying the power distribution control.

Because the distribution of the power which the engine supplies, the power which the first motor supplies, and the power which the second motor supplies is determined according to the required running power and loading-and unloading power, the power distribution can be determined so as to obtain the same operability as industrial vehicles used, for example, in loading and unloading operations, which have only an engine or a motor as a power source.

By increasing the distribution of the power supplied from the engine in a power range where the efficiency of the engine is high, and by increasing the distribution of the power supplied from the first motor and the second motor in a power range where the efficiency of the first motor and the second motor is high, the power can be used without waste, thus improving the fuel efficiency of the engine and reducing battery consumption.

In the invention described above, it is preferable that a plurality of sets of table data be provided in the power-distribution calculating unit, wherein the destination to be supplied with power from the engine and power from the first motor is selected based on a control status of the clutch unit, and the distribution of power which the engine supplies, power which the first motor supplies, and power which the second motor supplies is defined based on the calculated running power and loading-and unloading power; and the table data used for distributing the power be changed based on the control status of the clutch unit.

By doing so, the table data for setting the power distribution is stored in advance in the power-distribution calculating unit. It is possible to reduce the computational load for the power distribution, thus allowing a reduction in the computational time.

By switching the table data used for the power distribution based on the control status of the clutch unit, power distribution suitable for the operation status of the industrial vehicle is realized.

For example, when the clutch unit transmits the power to the running unit, the engine power and the first-motor power are transmitted to the running unit; and when the clutch unit blocks the transmission power to the running unit, the engine power and the first-motor power are transmitted to the loading-and-unloading unit, and the power is thus used without waste.

When the required power for running is small, the power distribution of the first motor and the second motor, which have less battery consumption, is set to be high, and when the required running power is large, the power distribution of the fuel efficient engine is set to be high, thus allowing the power to be used without waste.

In the above configuration, it is preferable that a velocity detection unit configured to detect a running velocity is further provided, wherein the plurality of sets of table data determine the distribution of the power which the engine supplies, the power which the first motor supplies, and the power which the second motor supplies also based on an output of the velocity detection unit.

By doing so, based on the running velocity of the industrial vehicle detected by the velocity detection unit, power distribution suitable for the running status can be realized, thus allowing the power to be used without waste.

For example, by increasing the power distribution supplied from the first motor, or both the first and the second motor, which have high acceleration performance, to the running unit in a medium- to low-speed region, and by increasing the power distribution supplied from the fuel efficient engine to the running unit 3 in a high-speed region, it is possible to control the power distribution to ensure optimum efficiency at all speeds.

In the above configuration, it is preferable that a battery configured to supply electrical power to a running motor and a loading-and-unloading motor, and a voltage detection unit configured to detect a voltage of the battery be further provided, wherein the plurality sets of table data preferably determine the distribution of the power which the engine supplies, the power which the first motor supplies, and the power which the second motor supplies also based on an output of the voltage detection unit.

By doing so, based on an output from the voltage detection unit, it is possible to reduce the consumption amount of the battery by, for example, increasing the power distribution of the engine when the battery voltage is low.

Moreover, when the loads of the running power and the loading-and-unloading power are low, electrical power is generated by rotationally driving the first motor or the second motor using the engine power, and the battery is charged thereby, thus allowing the amount of battery consumption to be further reduced.

A second aspect of the present invention is a power control method for an industrial vehicle including a required power calculating step of calculating, based on an operation by an operator, running power required by a running unit for running and loading-and-unloading power required by a loading-and-unloading unit for loading and unloading; and a power distribution calculating step of selecting a destination to be supplied with power from an engine and a first motor from among the running unit and the loading-and-unloading unit based on a control status of power transmitted from the engine to the running unit, and calculating a distribution of power which the engine supplies, power which the first motor supplies, and power which a second motor supplies to the running unit based on the calculated running power and loading-and-unloading power.

According to the second aspect of the invention, because the distribution of three variables, namely, the power which the engine supplies, the power which the first motor supplies, and the power which the second motor supplies, is calculated so as to satisfy the total of running power and loading-and-unloading power in the power-distribution calculating step, the number of variables can be reduced compared to a distribution method based on torque distribution using many variables. Accordingly, the distribution control can be simplified.

The destination to be supplied with power from the engine and the first motor is selected as either the running unit or the loading-and-unloading unit based on the control status of the power transmitted from the engine to the running unit, thus further simplifying the power distribution control.

According to the first aspect and the second aspect of the present invention, because the distribution of three variables, namely, the power which the engine supplies, the power which the first motor supplies, and the power which the second motor supplies, is calculated so as to satisfy the total of running power and loading-and-unloading power, the number of variables can be reduced compared to a distribution method based on torque distribution using many variables, which affords an advantage in that the distribution control can be simplified.

DETAILED DESCRIPTION OF THE INVENTION

First Embodiment

A forklift truck according to a first embodiment of the present invention will be described below with reference to FIGS. 1 to 3.

Figure 1:
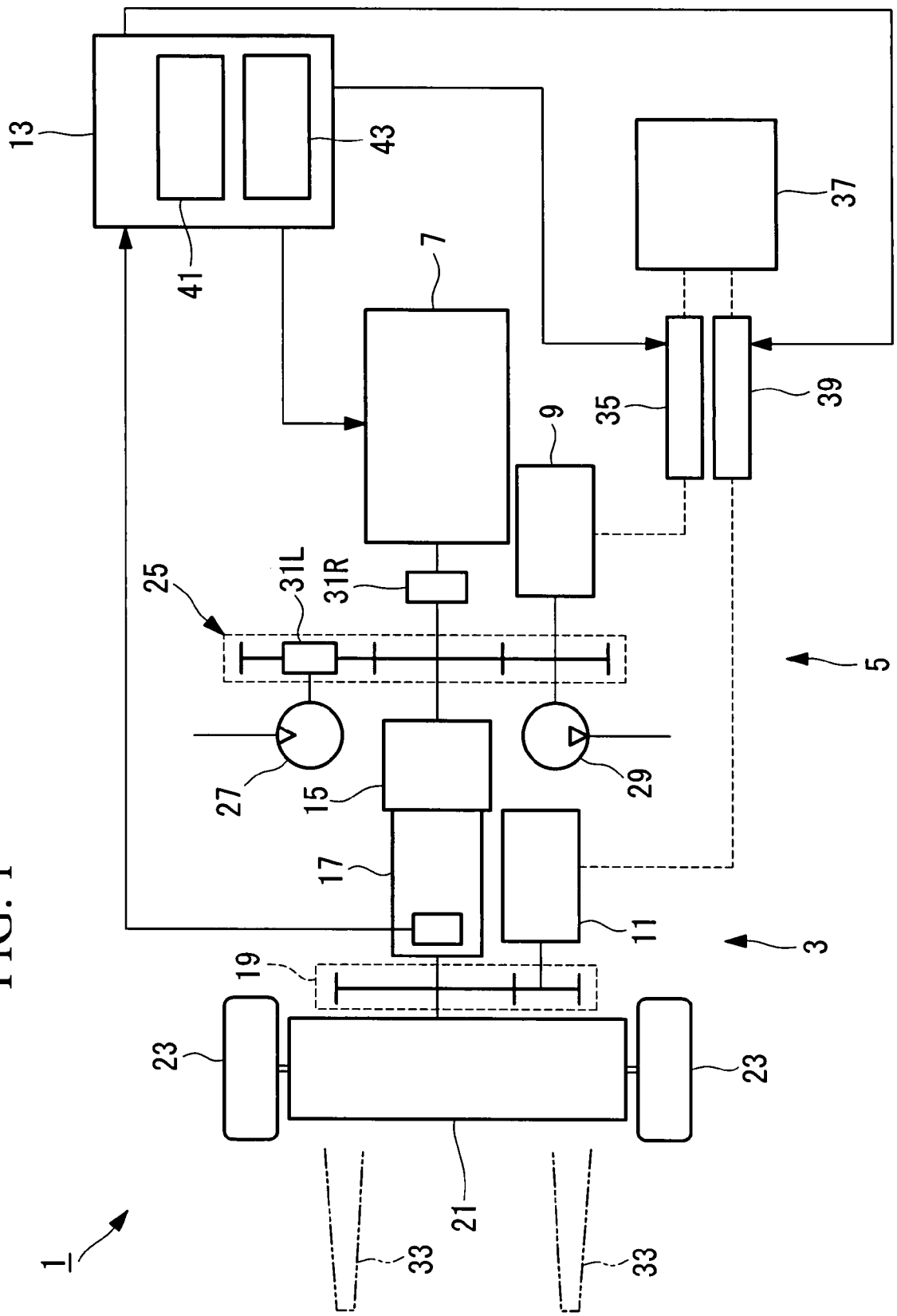
FIG. 1 is a diagram showing a power transmission system of a forklift truck according to a first embodiment of the present invention.

FIG. 1 is a diagram showing a power transmission system of a forklift truck 1 according to this embodiment.

In this embodiment, which concerns a hybrid forklift truck (hereinafter referred to as forklift truck) using an engine and a motor as a driving source, the description is applied to a parallel-type forklift truck using motor power as well as engine power for running and loading-and-unloading.

As shown in FIG. 1, the forklift truck (industrial vehicle) 1 is provided with a running unit 3 for running; a loading-and-unloading unit 5 for loading and unloading; an engine 7 and a first motor 9 for supplying power to either the running unit 3 or the loading-and-unloading unit 5; a second motor 11 for supplying power to the running unit 3; and a control unit 13 that obtains required power for the running unit 3 and the loading-and-unloading unit 5 and controls a power distribution of the engine 7, the first motor 9, and the second motor 11.

The running unit 3 is provided with a torque converter 15 for converting a torque of the power transmitted from a first-gear train 25 to a predetermined value; an FNR clutch (clutch unit) 17 for controlling the power transmission from the torque converter 15 to a second-gear train 19; the second-gear train 19 for transmitting the power from the FNR clutch 17 and the power of the second motor 11 to a differential device 21; the differential device 21 for transmitting the power to front wheels 23; and the front wheels 23 for running the forklift truck 1 by the power transmitted.

When transmitting the power from the torque converter 15 to the second-gear train 19, the FNR clutch 17 controls whether the forklift truck 1 is to move forward (F) without changing the rotational direction of the power or in reverse (R) by reversing the rotational direction, or whether the power transmission is to be blocked (neutral (N)).

The FNR clutch 17 is controlled by an operator of the forklift truck 1 operating a clutch pedal (not shown in the drawing). The status of the FNR clutch 17 is input to a power-distribution calculating unit 43.

The differential device 21, which is a device including a differential gear and so forth, changes the rotational direction of the power transmitted from the second-gear train 19, and absorbs any rotational difference between the right and left front wheels 23.

The loading-and-unloading unit 5 is provided with a first-gear train 25 for transmitting the power of the engine 7 and the first motor 9 to the torque converter 15, a hydraulic motor 27, and a hydraulic pump 29; the hydraulic motor 27 and the hydraulic pump 29 for generating a hydraulic pressure by the power transmitted; a one-way clutch 31L for transmitting the power from the first-gear train 25 only to the hydraulic motor 27; and a fork 33 used for loading and unloading.

The hydraulic motor 27 and the hydraulic pump 29 drive a hydraulic cylinder (not shown in the drawing) by the generated hydraulic pressure to raise and lower the fork 33.

The engine 7, whose output shaft is connected to the first-gear train 25 via the one-way clutch 31R, receives an engine power command for controlling the power which the engine 7 supplies from a power-distribution calculating unit 43.

The one-way clutch 31R transmits the power from the engine 7 only to the first-gear train 25.

The first motor 9 is connected to the first-gear train 25 by an output shaft thereof, and an electrical current is supplied from a battery 37 via a first inverter 35.

The first inverter 35 converts DC current supplied from the battery 37 to AC current and controls the power generated by the first motor 9. A first-motor power command for controlling the power which the first motor 9 supplies is input to the first inverter 35 from the power-distribution calculating unit 43.

The second motor 11 is connected to the second-gear train 19 by an output shaft thereof, and an electrical current is supplied from the battery 37 via a second inverter 39.

The second inverter 39 converts DC current supplied from the battery 37 to AC current and controls the power generated by the second motor 11. A second-motor power command for controlling the power which the second motor 11 supplies is input to the second inverter 39 from the power-distribution calculating unit 43.

The control unit 13 includes a required-power calculating unit 41 and the power-distribution calculating unit 43. The required-power calculating unit 41 calculates a running power (power for running) PR supplied to the running unit 3 and a loading-and-unloading power (power for loading and unloading) PL supplied to the loading-and-unloading unit 5. The power-distribution calculating unit 43 calculates the distribution of engine power PEG, first-motor power PM1, and second-motor power PM2.

The power-distribution calculating unit 43 outputs the engine power command that is input to the engine 7, the first-motor power command that is input to the first motor 9, and the second-motor power command that is input to the second motor 11, based on the calculated power distribution.

Next, the power distribution of the forklift truck 1 having the above configuration will be described.

Figure 2:
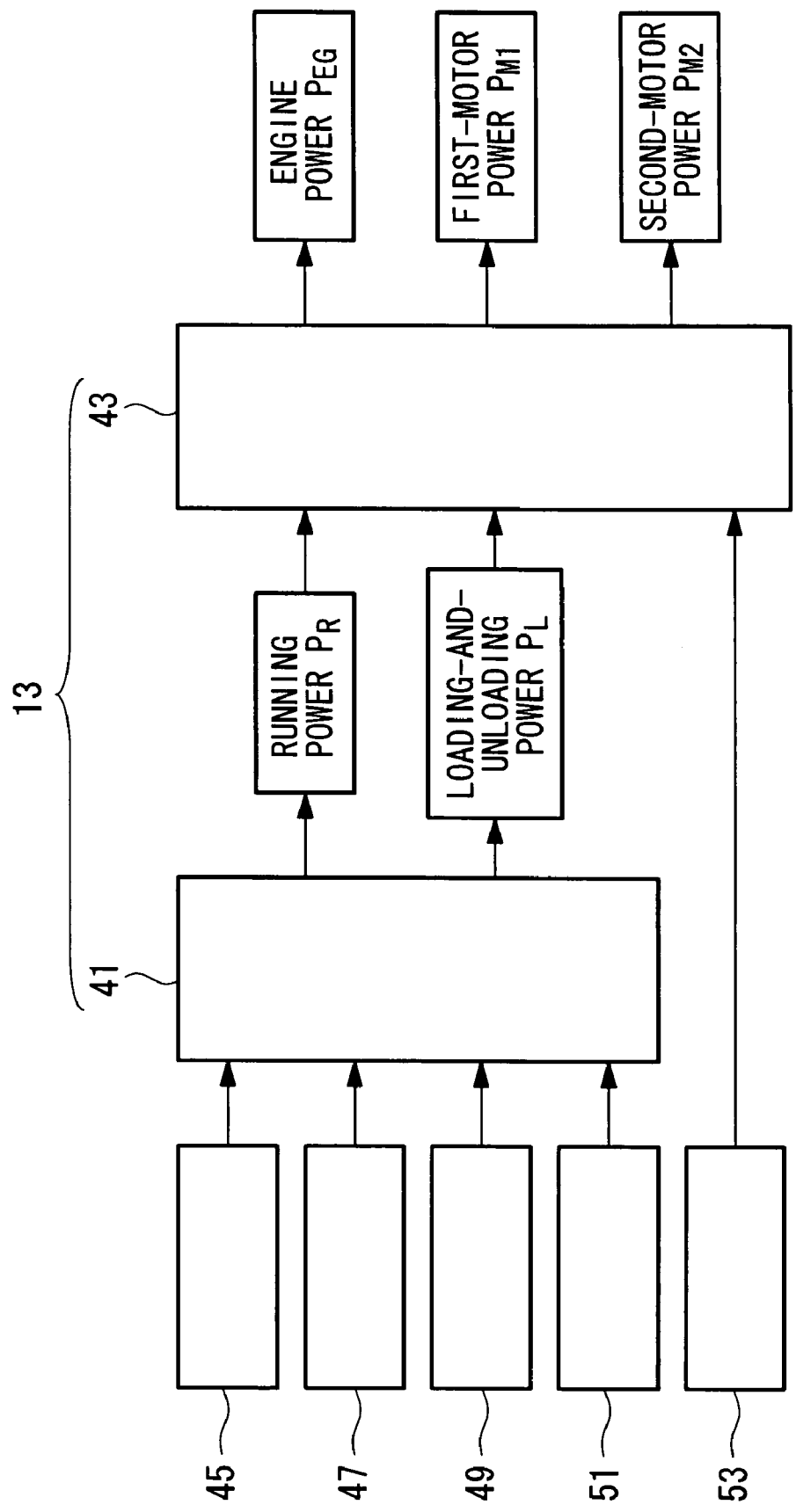
FIG. 2 is a block diagram for explaining a method of distributing power in a control unit in FIG. 1.

FIG. 2 is a block diagram for explaining a method of distributing power in a control unit 13 in FIG. 1.

As shown in FIG. 2, an accelerator-pedal depression amount 45, a brake-pedal depression amount 47, a lift-lever operating amount 49, and a tilt-lever operating amount 51, which are all set by the operator, are input to the required-power calculating unit 41 of the control unit 13. The required-power calculating unit 41 calculates the running power PR required for running and the loading-and-unloading power PL required for loading and unloading based on these operating amounts that are input thereto (required-power calculating step).

For example, the running power PR required for running is obtained from the accelerator-pedal depression amount 45, the brake-pedal depression amount 47, and so forth; and the loading-and-unloading power PL required for loading and unloading is obtained from the lift-lever operating amount 49, the tilt-lever operating amount 51, and so forth.

The calculated running power PR and loading-and-unloading power PL are input to the power-distribution calculating unit 43, and a clutch-pedal switch signal 53 showing the status of the FNR clutch 17 is further input thereto.

The power-distribution calculating unit 43 selects one set of table data from a plurality of sets of table data that are stored in advance based on the clutch-pedal switch signal 53 and, based on the calculated running power PR and loading-and-unloading power PL, calculates the distribution of the engine power PEG, the first-motor power PM1, and the second-motor power PM2 to satisfy equation (1) below (power-distribution calculating step).

$$P_R + P_L = P_{EG} + P_{M1} + P_{M2} \tag{1}$$

Here, because the engine power PEG, the first-motor power PM1, and the second-motor power PM2 are calculated by multiplying a torque by a rotational speed, equation (1) above can also be represented by equation (2) below.

$$P_R + P_L = T_{EG} \times \omega_{EG} + T_{M1} \times \omega_{M1} + T_{M2} \times \omega_{M2} \tag{2}$$

Here, TEG is the engine torque, and ωEG is the engine rotational speed. TM1 is the first-motor torque, and ωM1 is the first-motor rotation speed. TM2 is the second-motor torque, and ωM2 is the second-motor rotation speed.

As shown in equation (2) above, when distributing power based on torque, six variables must be controlled to determine the torque so as to satisfy the power balance, thus making control difficult.

Accordingly, as shown in equation (1), the power balance is satisfied by controlling three variables, that is, the engine power PEG, the first-motor power PM1, and the second-motor power PM2 in this embodiment.

More specific details will be described below.

Figure 3:
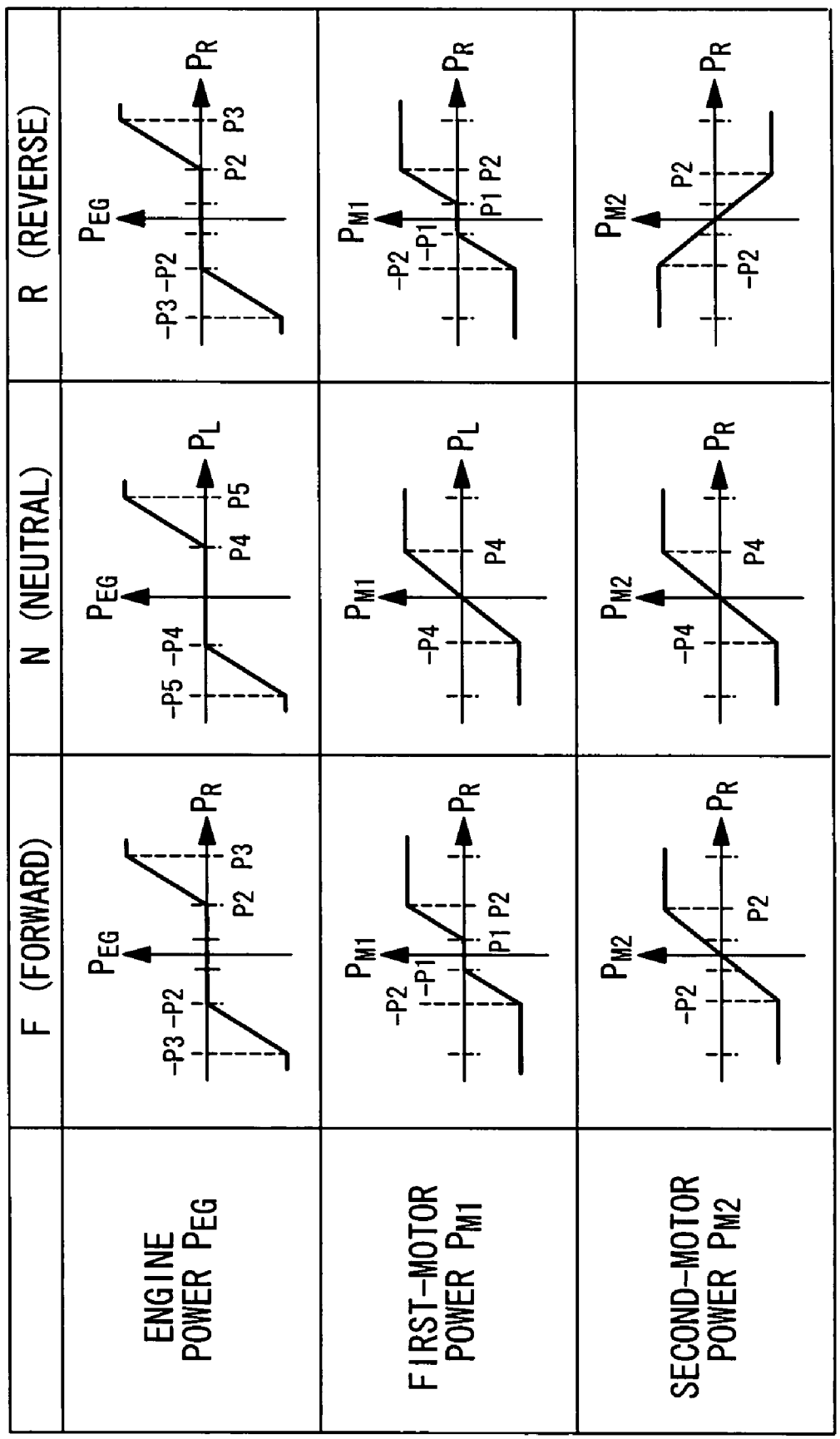
FIG. 3 is a diagram for explaining a plurality of sets of table data stored in a power-distribution calculating unit in FIG. 2.

FIG. 3 is a diagram for explaining a plurality of sets of table data stored in the power-distribution calculating unit 43 in FIG. 2.

As shown in FIG. 3, the plurality of sets of table data stored in the power-distribution calculating unit 43 are classified by the clutch-pedal switch signal 53 (F: forward, N: neutral, and R: reverse). The power-distribution calculating unit 43 selects the table data corresponding to F, the table data corresponding to N, and the table data corresponding to R, respectively, based on the clutch-pedal switch signal 53.

Each set of table data, in which the distribution of the engine power PEG, the first-motor power PM1, and the second-motor power PM2 corresponding to the running power PR and the loading-and-unloading power PL input is defined, satisfies equation (1) above.

Then, the power-distribution calculating unit 43 calculates the distribution of the engine power PEG, the first-motor power PM1, and the second-motor power PM2 based on the selected table data.

For example, when the table data corresponding to F or R is selected, the engine power PEG, the first-motor power PM1, and the second-motor power PM2 are all calculated based on the running power PR. When the running power PR is from zero to the first predetermined power P1, the power is distributed so that only the second-motor power PM2 is supplied to the running unit 3 in proportion to the running power PR; and when the running power PR is from the first predetermined power P1 to the second predetermined power P2, the power is distributed so that the first-motor power PM1 and the second-motor power PM2 are supplied to the running unit 3 in proportion to the running power PR.

When the running power PR is from the second predetermined power P2 to the third predetermined power P3, the power is distributed so that the first-motor power PM1 and the second-motor power PM2 are constantly supplied, and, at the same time, the engine power PEG is supplied to the running unit 3 in proportion to the running power PR; and when the running power PR is larger than the third predetermined power P3, the power is distributed so that the engine power PEG, the first-motor power PM1, and the second-motor power PM2 are constantly supplied to the running unit 3.

As shown in FIG. 3, when the running power PR is a negative value, since the engine 7 cannot generate negative power, the power distribution of the engine power PEG is always zero.

The power distribution of the first-motor power PM1 and the second-motor power PM2 is the same as the above.

In other words, when the running power PR is from zero to a negative first predetermined power −P1, the power is distributed so that only the second-motor power PM2 is supplied to the running unit 3 in proportion to the running power PR; and when the running power PR is from the negative first predetermined power −P1 to a negative second predetermined power −P2, the power is distributed so that the first-motor power PM1 and the second-motor power PM2 are supplied to the running unit 3 in proportion to the running power PR. When the running power PR is from the negative second predetermined power −P2 to a negative third predetermined power −P3, the power is distributed so that the first-motor power PM1 and the second-motor power PM2 are constantly supplied.

In the table data corresponding to R, only the graph of the second-motor power PM2 slopes down from left to right. This is because only the second-motor power PM2 is transmitted to the front wheels 23 without passing through the FNR clutch.

When the table data corresponding to N is selected, the engine power PEG and the first-motor power PM1 are calculated based on the loading-and-unloading power PL, and the second-motor power PM2 is calculated based on the running power PR.

In the table data of engine power PEG and the first-motor power PM1 corresponding to N, when the loading-and-unloading power PL is from zero to a fourth predetermined power P4, the power is distributed so that only the first-motor power PM1 is supplied to the loading-and-unloading unit 5 in proportion to the loading-and-unloading power PL; and when the loading-and-unloading power PL is from the fourth predetermined power P4 to a fifth predetermined power P5, the power is distributed so that the first-motor power PM1 is constantly supplied, and, at the same time, the engine power PEG is supplied to the loading-and-unloading unit 5 in proportion to the loading-and-unloading power PL. When the loading-and-unloading power PL is larger than the fifth predetermined power P5, the power is distributed so that the engine power PEG and the first-motor power PM1 are constantly supplied to the loading-and-unloading unit 5.

On the other hand, when the running power PR is from zero to the fourth predetermined power P4, the power is distributed so that the second-motor power PM2 is supplied to the running unit 3 in proportion to the running power PR; and when the running power PR is larger than the fourth predetermined power P4, the power is distributed so that a constant power is supplied to the running unit 3.

The power-distribution calculating unit 43 outputs the engine power command, the first-motor power command, and the second-motor power command to the engine 7, the first inverter 35, and the second inverter 39, respectively, based on the calculated engine power PEG, the first-motor power PM1, and the second-motor power PM2 described above.

The table data, where the distribution of the engine power PEG, the first-motor power PM1, and the second-motor power PM2 is defined, is not limited; the power may be distributed as shown in FIG. 3, or any other method of distributing power may be employed.

Next, the operation of the forklift truck 1 during running and loading-and-unloading will be described.

As shown in FIG. 1, when the forklift truck 1 runs forward (when the FNR clutch 17 selection is F (forward), and when the running power PR is smaller than the first predetermined power P1, the second-motor power command is input to the second inverter 39 to generate the second-motor power PM2 from the second motor 11. The second-motor power PM2 is input to the differential device 21 via the second-gear train 19. The second-motor power PM2 input to the differential device 21 is transmitted to the front wheels 23 to produce forward driving power of the forklift truck 1.

The second-motor power PM2 is transmitted from the FNR clutch 17 to the first-gear train 25 via the torque converter 15; however, the power to the engine 7 is blocked by the one-way clutch 31R.

When the running power PR is from the first predetermined power P1 to the second predetermined power P2, the first-motor power command is further input to the first inverter 35 to generate the first-motor power PM1 from the first motor 9. The first-motor power PM1 is transmitted from the first-gear train 25 to the torque converter 15, the FNR clutch 17, the differential device 21, and the front wheels 23 in this order.

When the running power PR is larger than the second predetermined power P2, the engine power command is further input to the engine 7 to generate the engine power PEG from the engine 7. The engine power PEG is transmitted from the one-way clutch 31R to the first-gear train 25, the torque converter 15, the FNR clutch 17, the differential device 21, and the front wheels 23 in this order.

When the forklift truck runs in reverse (when the FNR clutch 17 selection is R (reverse)), the only difference is that the rotations of the running power PR and the first-motor power PM1 are reversed at the FNR clutch 17, and the rotation of the second-motor power PM2 generated by the second motor 11 is reversed. Other operations are substantially the same as the forward-running operation, and a description thereof is thus omitted here.

When the FNR clutch 17 selection is N (neutral), and when the loading-and-unloading power PL is smaller than the fourth predetermined power P4, the first-motor power command is input to the first inverter 35 to generate the first-motor power PM1 from the first motor 9. The first-motor power PM1 is transmitted from the first-gear train 25 to the hydraulic motor 27 and the hydraulic pump 29 to generate a hydraulic pressure at the hydraulic motor 27 and the hydraulic pump 29. The hydraulic cylinder (not shown in the drawing) is driven by the generated hydraulic pressure, and the fork 33 is raised and lowered accordingly.

When the loading-and-unloading power PL is between the fourth predetermined power P4 and the fifth predetermined power P5, the engine power command is further input to the engine 7 to generate the engine power PEG from the engine 7. The engine power PEG is transmitted from the one-way clutch 31R to the first-gear train 25, the hydraulic motor 27, and the hydraulic pump 29 in this order.

In addition, although the first-motor power PM1 and the engine power PEG are transmitted from the first-gear train 25 to the torque converter 15, they are blocked at the FNR clutch 17.

The second-motor power command is input to the second inverter 39 to generate the second-motor power PM2 from the second motor 11. The second-motor power PM2 is input to the differential device 21 via the second-gear train 19. The second-motor power PM2 input to the differential device 21 is transmitted to the front wheels 23 to produce the forward propulsion of the forklift truck 1.

The transmission of the second-motor power PM2 from the FNR clutch 17 to the torque converter 15 is blocked.

On the other hand, when a regenerative operation is performed (during power regeneration), the rotation of the front wheels 23 is transmitted to the second motor 11 via the differential device 21 to drive the second motor 11, thus functioning as a generator which generates electrical power. The generated electrical power is charged in the battery 37 via the second inverter 39.

During the loading and unloading operation, the rotation produced at the loading and unloading device side is transmitted to the first motor 9 to drive the first motor 9, thus functioning as a generator which generates electrical power. The generated electrical power is stored at the battery 37 via the first inverter 35.

According to the above configuration, because the power-distribution calculating unit 43 calculates the distribution of these three variables, that is, the engine power PEG, the first-motor power PM1, and the second-motor power PM2, so as to satisfy the total of the running power PR and the loading-and-unloading power PL, the number of variables can be reduced compared to a distribution method based on torque distribution using many variables. Accordingly, the distribution control can be simplified.

The destination to be supplied with engine power PEG and the first-motor power PM1 is selected as either the running unit 3 or the loading-and-unloading unit 5 based on the control status of the FNR clutch 17, thus further simplifying the power distribution control.

Because the distribution of the engine power PEG, the first-motor power PM1, and the second-motor power PM2 is determined according to the required running power PR and loading-and-unloading power PL, the power distribution can be determined so as to obtain the same operability as industrial vehicles used, for example, in loading and unloading operations, which have only an engine or a motor as a power source.

By increasing the distribution of the engine power PEG in a power range where the efficiency of the engine 7 is high, and by increasing the power distribution which the first-motor power PM1 and the second-motor power PM2 supply in a power range where the efficiency of the first motor 9 and the second motor 11 is high, the power can be used without waste, thus improving the fuel efficiency of the engine 7 and reducing the battery 37 consumption.

Because the table data for setting the power distribution is stored in advance in the power-distribution calculating unit 43, it is possible to reduce the computational load for the power distribution, thus allowing a reduction in the computational time.

By switching the table data used for the power distribution based on the control status of the FNR clutch 17, power distribution suitable for the operation status of the forklift truck 1 is realized.

When the FNR clutch 17 transmits the power to the running unit 3 (in the case of F or R), the engine power PEG and the first-motor power PM1 are transmitted to the running unit 3; and when the FNR clutch 17 blocks the transmission power to the running unit 3 (in a case of N), the engine power PEG and the first-motor power PM1 are transmitted to the loading-and-unloading unit 5, and the power is thus used without waste.

When the required running power PR is small, the distribution of the first-motor power PM1 and the second-motor power PM2, which have less battery 37 consumption, is set to be high, and when the required running power PR is large, the distribution of the fuel efficient engine power PEG is set to be high, thus allowing the power to be used without waste.

Second Embodiment

Next, a second embodiment of the present invention will be described with reference to FIGS. 4 and 5.

The basic configuration of the forklift truck of this embodiment is the same as that of the first embodiment, but the method of calculating the power distribution is different from that of the first embodiment. Therefore, only the method of calculating the power distribution will be described in this embodiment using FIGS. 4 and 5, and a description of other elements will be omitted.

Figure 4:
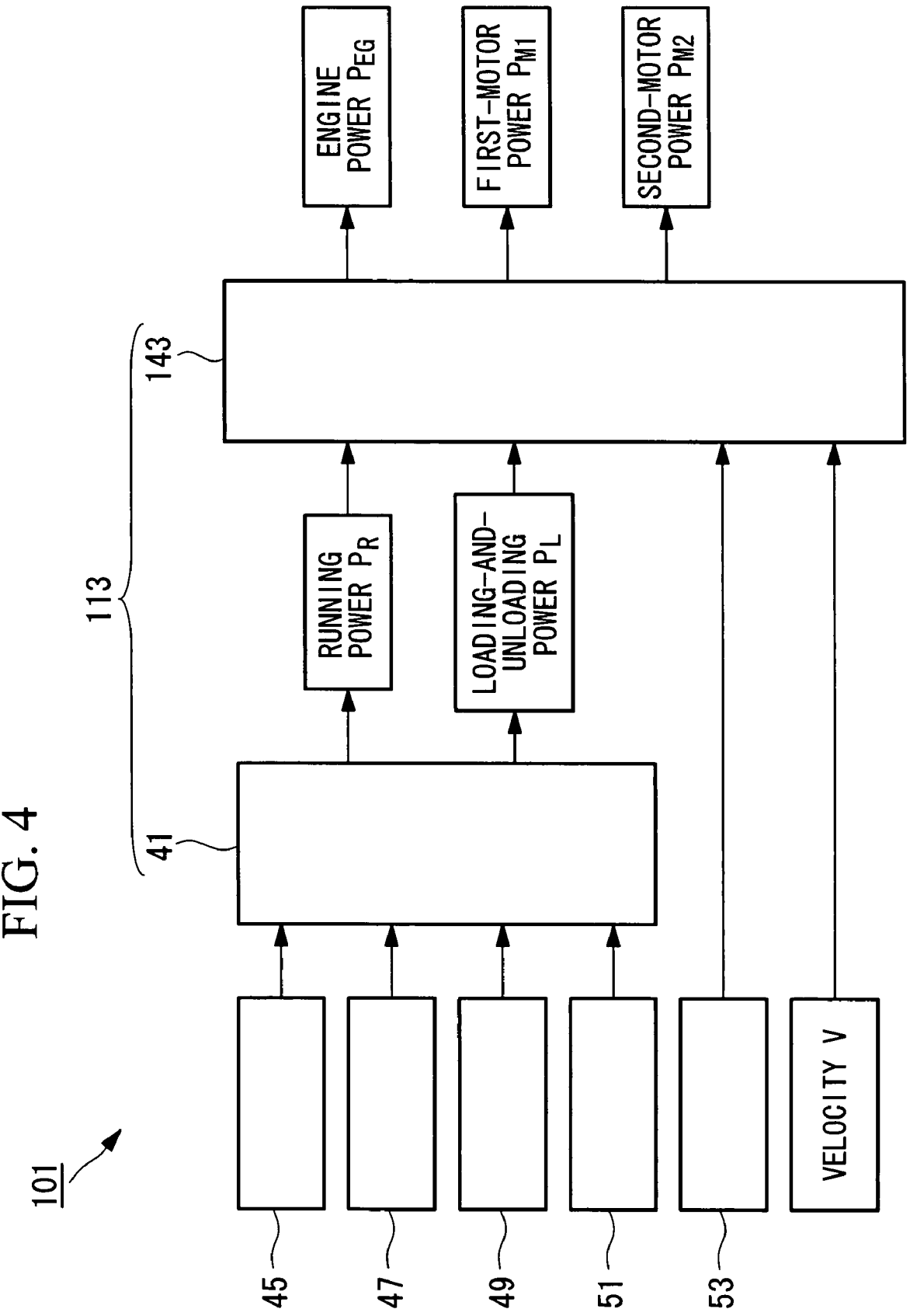
FIG. 4 is a block diagram for explaining a method of distributing power in a control unit of a forklift truck according to a second embodiment of the present invention.

FIG. 4 is a block diagram for explaining a method of distributing power in a control unit 113 of a forklift truck 101 according to this embodiment.

Elements that are identical to those of the first embodiment are assigned the same reference numerals, and a description thereof shall be omitted.

As shown in FIG. 4, the accelerator-pedal depression amount 45, the brake-pedal depression amount 47, the lift-lever operating amount 49, and the tilt-lever operating amount 51, which are all set by the operator, are input to the required-power calculating unit 41 of the control unit 113 of the forklift truck (industrial vehicle) 101. The required-power calculating unit 41 calculates the running power PR required for running and the loading-and-unloading power PL required for loading and unloading based on these operating amounts that are input thereto.

The calculated running power PR and loading-and-unloading power PL are input to a power-distribution calculating unit 143. The clutch-pedal switch signal 53 showing the status of the FNR clutch 17 and a running velocity V of the forklift truck 101, which is detected from a rotation speed of the second motor (velocity detection unit) 11 (see FIG. 1) are further input to the power-distribution calculating unit 143.

The configuration is not particularly limited, however. The running velocity may be detected from the rotation speed of the second motor 11 connected to the front wheels 23 via the differential device 21 and the second-gear train 19, as described above, or a velocity sensor for detecting the running velocity of the forklift truck 101 may be separately provided.

The power-distribution calculating unit 143 selects one set of table data from a plurality of sets of table data that are stored in advance based on the clutch-pedal switch signal 53 and, based on the calculated running power PR, loading-and-unloading power PL, and running velocity V, calculates the distribution of the engine power PEG, the first-motor power PM1, and the second-motor power PM2 to satisfy equation (1) above.

Figure 5:
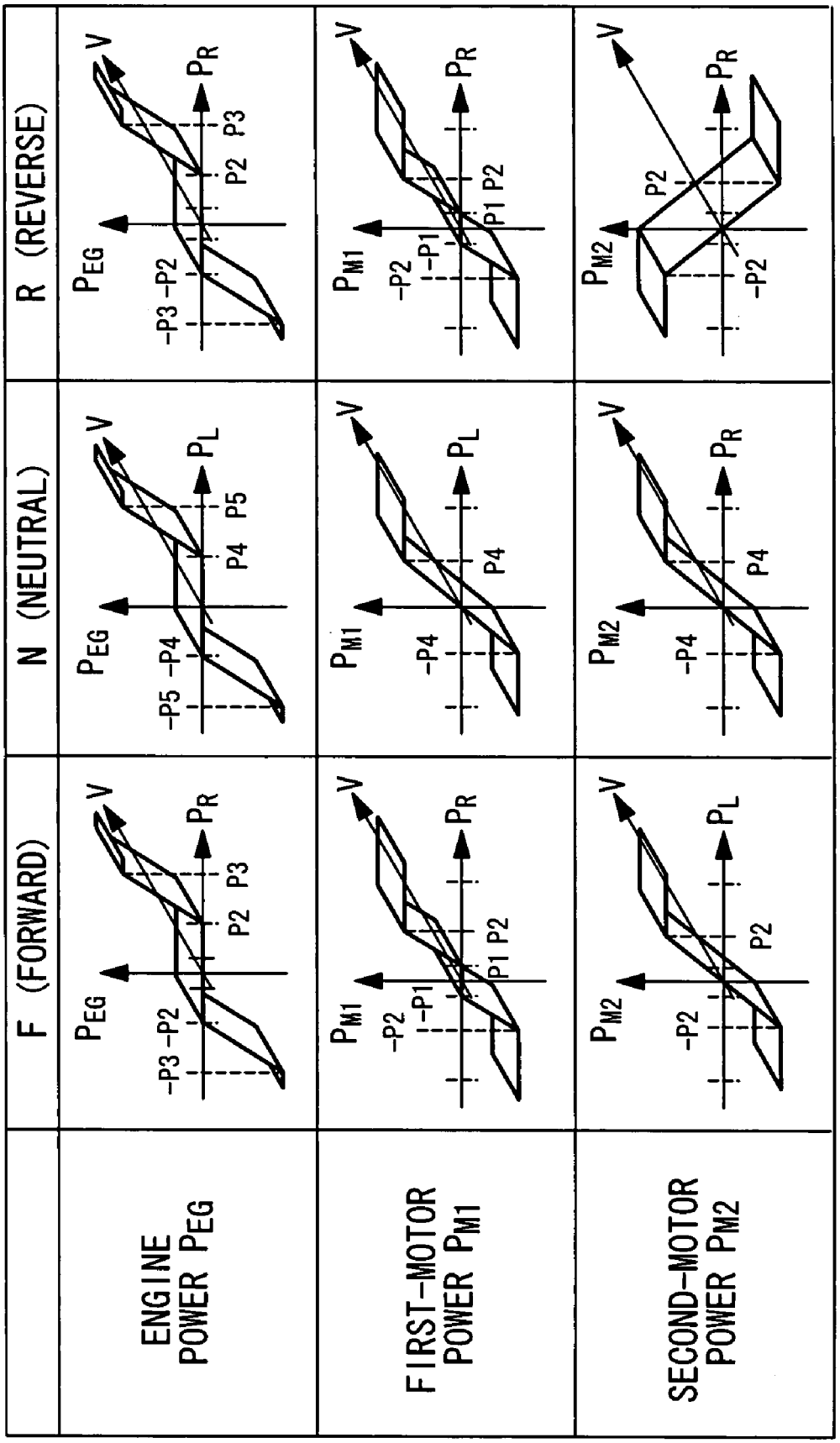
FIG. 5 is a diagram for explaining a plurality of sets of table data stored in a power-distribution calculating unit in FIG. 4.

FIG. 5 is a diagram for explaining a plurality of sets of table data stored in the power-distribution calculating unit 143 in FIG. 4.

More specifically, as shown in FIG. 5, the plurality of sets of table data stored in the power-distribution calculating unit 143 are classified according to the clutch-pedal switch signal 53 (F: forward, N: neutral, and R: reverse). The power-distribution calculating unit 143 selects the table data corresponding to F, the table data corresponding to N, and the table data corresponding to R, respectively, based on the clutch-pedal switch signal 53.

Each set of table data, in which the distribution of the engine power PEG, the first-motor power PM1, and the second-motor power PM2 corresponding to the running power PR, the loading-and-unloading power PL, and the running velocity V input is defined, satisfies equation (1) above.

Then, the power-distribution calculating unit 143 calculates the distribution of the engine power PEG, the first-motor power PM1, and the second-motor power PM2 based on the selected table data and changes the power distribution according to the value of the running velocity V when the clutch-pedal switch signal 53 is F or R.

In this embodiment, the description is applied to a case where the power distribution is the same as that of the first embodiment when the value of the running velocity V is zero. Therefore, the description of when the value of the running velocity V is zero will be omitted.

As shown in the table data corresponding to F and R in FIG. 5, the power distribution ratio of the engine power PEG increases according to the increase of the running velocity V.

As shown in the table data corresponding to F and R in FIG. 5, the power distribution ratio of the first-motor power PM1 decreases according to the increase of the running velocity V value when the required power (PR) is positive, and increases according to the increase of the running velocity V value when the required power (PR) is negative.

As shown in the table data corresponding to F in FIG. 5, the power distribution ratio of the second-motor power PM2 decreases according to the increase of the running velocity V value when the required power (PL) is positive, and increases according to the running velocity V value when the required power (PL) is negative.

As shown in the table data corresponding to R in FIG. 5, the power distribution ratio increases according to the increase of the running velocity V value when the required power (PR) is positive, and decreases according to the running velocity V value when the required power (PR) is negative.

According to the above configuration, based on the running velocity V of the forklift truck 101 detected from the rotation speed of the second motor 11, power distribution suitable for the running status of the forklift truck 101 can be realized. Accordingly, it is possible to use the power without waste.

For example, by increasing the power distribution supplied from the first motor 9, or both the first motor 9 and the second motor 11, which have high acceleration performance, to the running unit 3 in a medium to low speed region, and by increasing the power distribution supplied from the fuel efficient engine 7 to the running unit 3 in a high speed region, it is possible to control the power distribution to ensure optimum efficiency at all speeds.

Third Embodiment

Next, a third embodiment of the present invention will be described with reference to FIGS. 6 to 9.

The basic configuration of the forklift truck of this embodiment is the same as that of the first embodiment, but the method of calculating a power distribution is different from the first embodiment. Therefore, only the method of calculating the power distribution will be described in this embodiment using FIGS. 6 to 9, and a description of other elements will be omitted.

Figure 6:
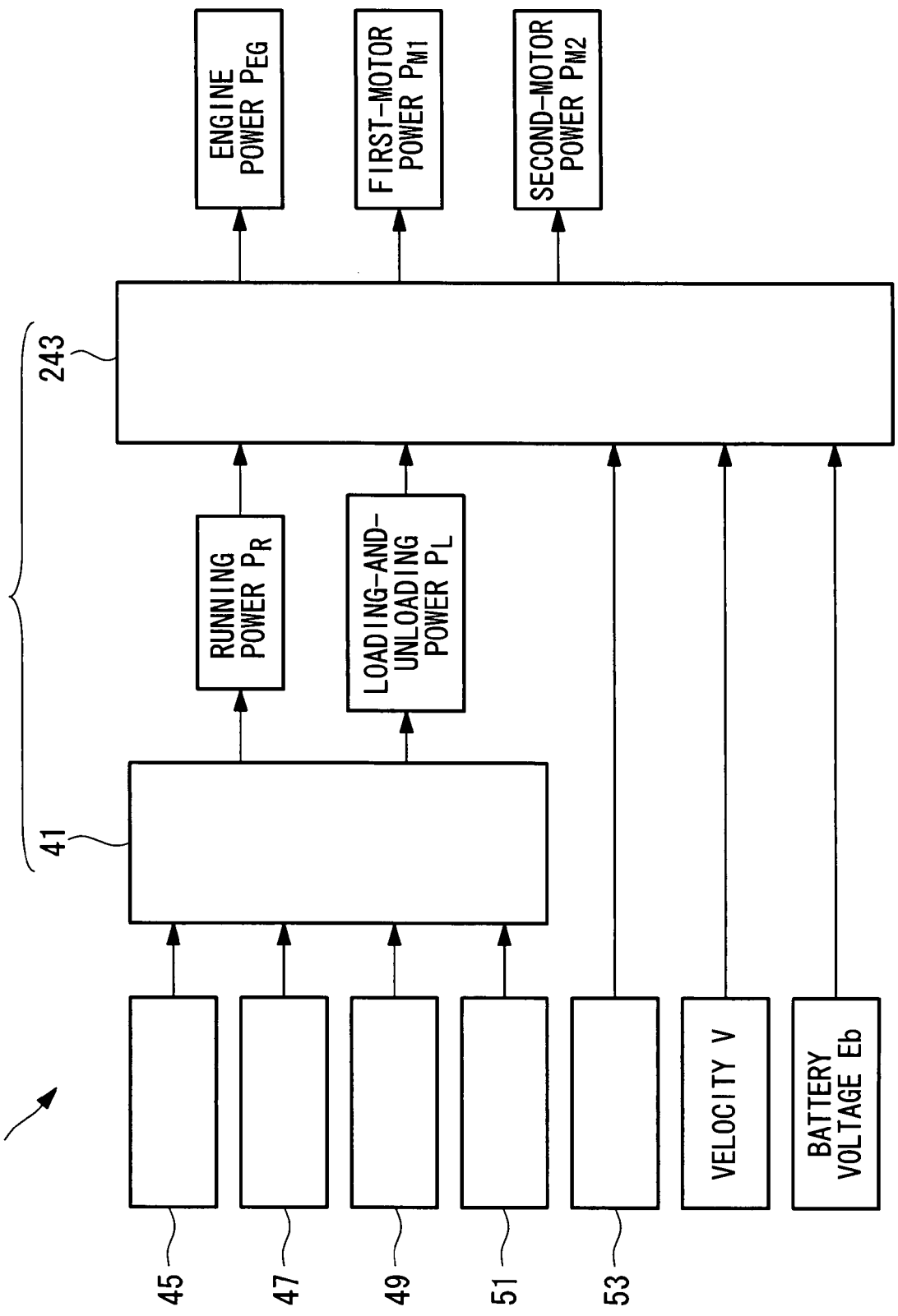
FIG. 6 is a block diagram for explaining a method of distributing power in a control unit of a forklift truck according to a third embodiment of the present invention.

FIG. 6 is a block diagram for explaining a method of distributing power in a control unit 213 of a forklift truck 201 according to this embodiment.

Elements that are identical to those of the first embodiment are assigned the same reference numerals, and a description thereof shall be omitted.

As shown in FIG. 6, the accelerator-pedal depression amount 45, the brake-pedal depression amount 47, the lift-lever operating amount 49, and the tilt-lever operating amount 51, which are all set by the operator, are input to the required-power calculating unit 41 of the control unit 213 of the forklift truck (industrial vehicle) 201. The required-power calculating unit 41 calculates the running power PR required for running and the loading-and-unloading power PL required for loading and unloading based on these operating amounts that are input thereto.

The calculated running power PR and the loading-and-unloading power PL are input to a power-distribution calculating unit 243, and the clutch-pedal switch signal 53 showing the status of the FNR clutch 17 and the running velocity V of the forklift truck 201 detected from the rotation speed of the second motor 11 (see FIG. 1) are further input to the power-distribution calculating unit 243. In addition, since a battery voltage Eb is also input to the power-distribution calculating unit 243 from the battery 37, the power-distribution calculating unit 243 also serves as a voltage detection unit.

The configuration is not particularly limited, however. The power-distribution calculating unit 243 may directly detect a battery voltage Eb as described above, or a voltage detection sensor for detecting the battery voltage Eb may be separately provided.

The power-distribution calculating unit 243 selects one set of table data from a plurality of sets of table data that are stored in advance based on the clutch-pedal switch signal 53 and, based on the calculated running power PR and loading-and-unloading power PL, as well as the running velocity V and the battery voltage Eb, calculates the distribution of the engine power PEG, the first-motor power PM1, and the second-motor power PM2 to satisfy equation (1) above.

Figure 7:
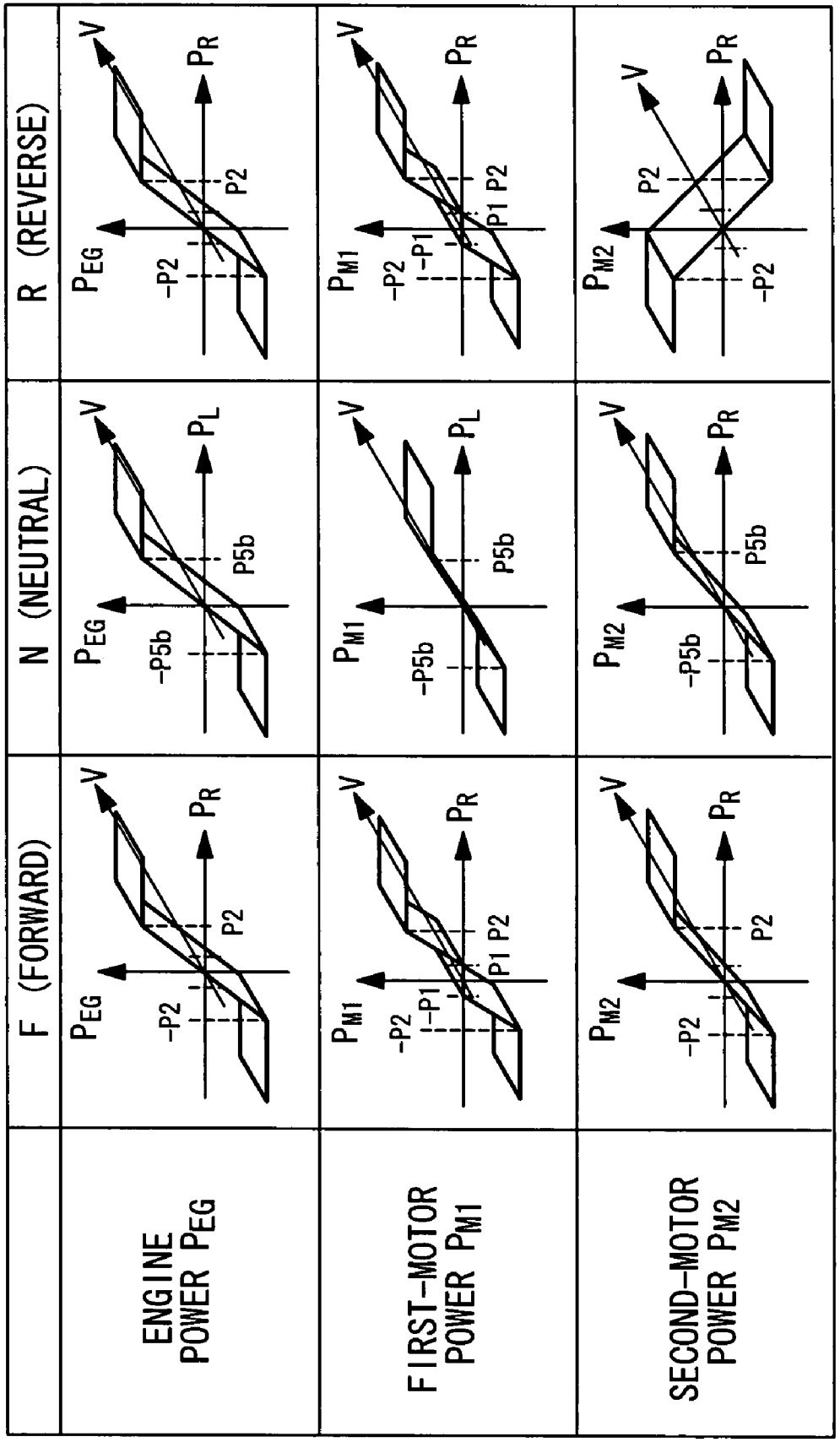
FIG. 7, which shows a plurality of sets of table data stored in a power-distribution calculating unit in FIG. 6, is a diagram for explaining one set of table data classified by battery voltage.
Figure 8:
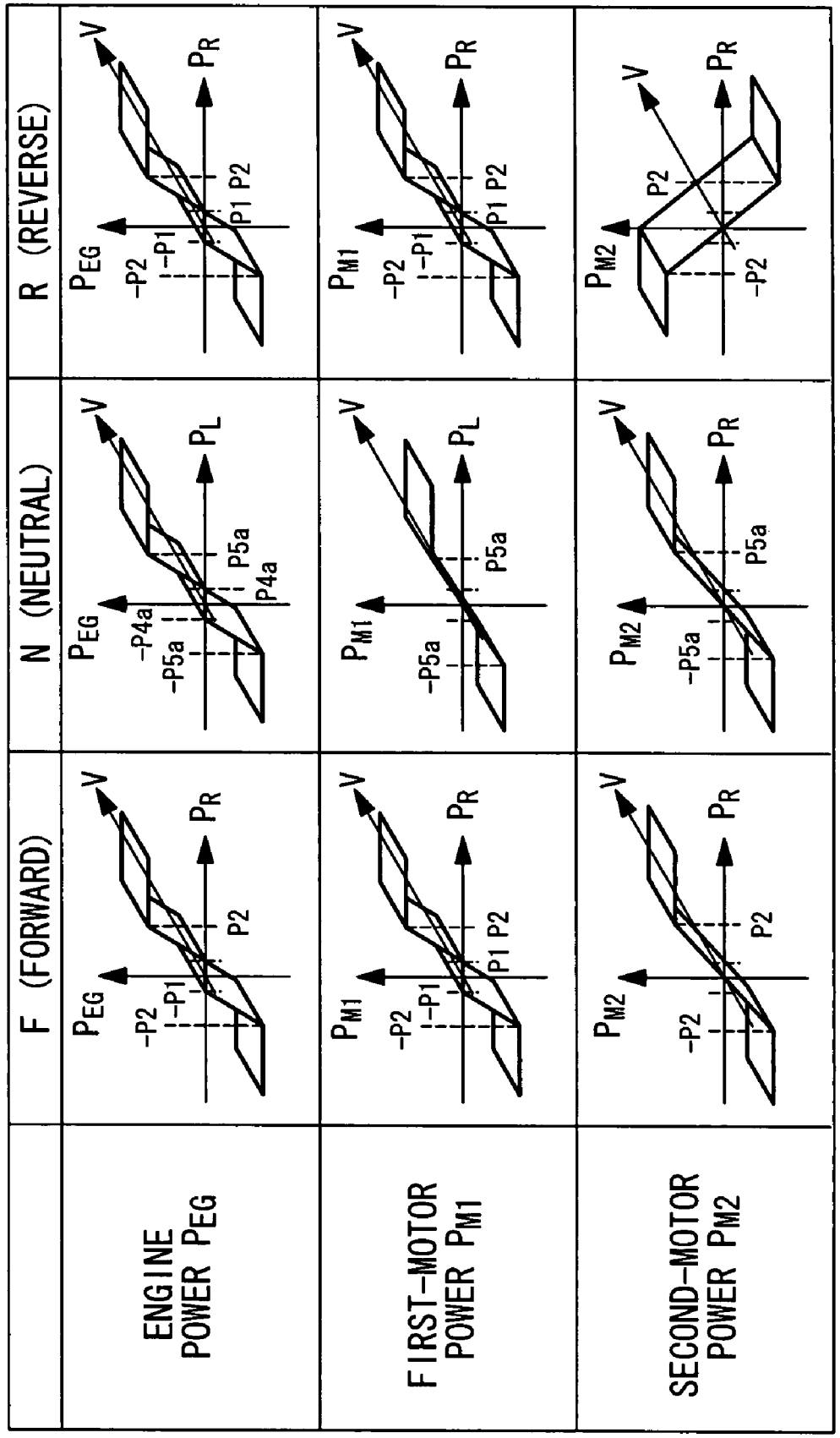
FIG. 8, which shows a plurality of sets of table data stored in the power-distribution calculating unit in FIG. 6, is a diagram for explaining one set of table data classified by battery voltage.
Figure 9:
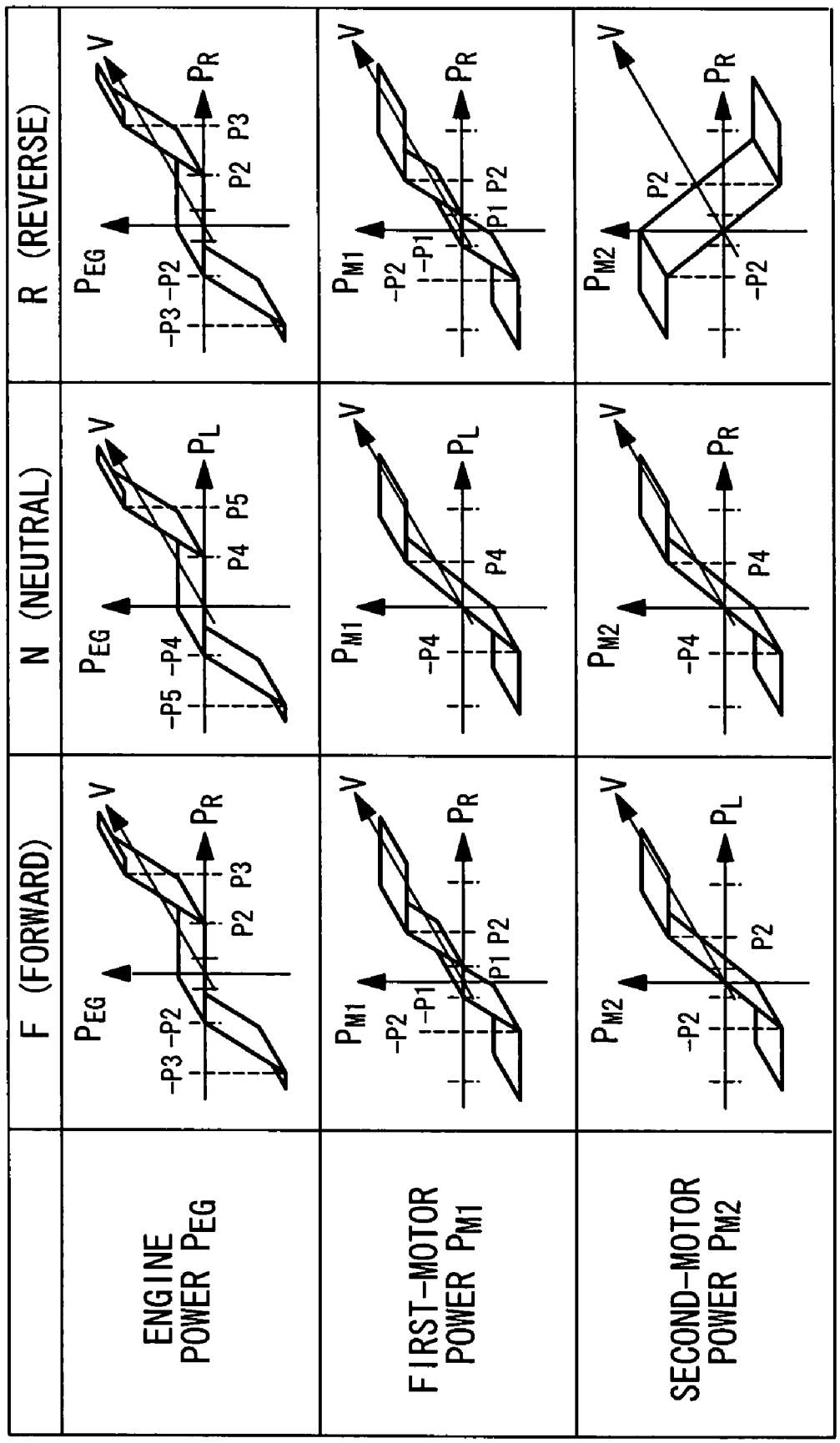
FIG. 9, which shows a plurality of sets of table data stored in the power-distribution calculating unit in FIG. 6, is a diagram for explaining one set of table data classified by battery voltage level.

FIGS. 7 to 9, which show a plurality of sets of table data stored in the power-distribution calculating unit 243 shown in FIG. 6, are diagrams for explaining one set of table data classified by battery voltage.

More specifically, as shown in FIGS. 6 to 9, the plurality of sets of table data stored in the power-distribution calculating unit 243 are classified by battery voltage Eb: from a first predetermined voltage E1 to a second predetermined voltage E2 or less (FIG. 7), from the second predetermined voltage E2 to a third predetermined voltage E3 or less (FIG. 8), or from the third predetermined voltage E3 to a fourth predetermined voltage E4 or less (FIG. 9). It is further classified by clutch-pedal switch signal 53 (F: forward, N: neutral, and R: reverse) (FIGS. 7 to 9).

The power-distribution calculating unit 243 selects table data based on the value of the battery voltage Eb, and further selects the table data corresponding to F, the table data corresponding to N, and the table data corresponding to R, respectively, based on the clutch-pedal switch signal 53.

Each set of table data, in which the distribution of the engine power PEG, the first-motor power PM1, and the second-motor power PM2 corresponding to the running power PR, the loading-and-unloading power PL, and the running velocity V input is defined, satisfies equation (1) above.

When the battery voltage Eb satisfies the relationship E1 <Eb≦E2, the power-distribution calculating unit 243 selects the table data shown in FIG. 7. In this table data, the method of distributing the engine power PEG is different from that of the first and second embodiments.

In other words, when the table data corresponding to F or R is selected, and when the running power PR is from zero to the second predetermined power P2, the power is distributed so that the engine power PEG is supplied to the running unit 3 in proportion to the running power PR, and when the running power PR is higher than the second predetermined power P2, the power is distributed so that the engine power PEG is constantly supplied.

When the table data corresponding to N is selected, and when the loading-and-unloading power PL is from zero to a fifth predetermined power P5b, the power is distributed so that the engine power PEG is supplied to the loading-and-unloading unit 5 in proportion to the loading-and-unloading power PL; and when the loading-and-unloading power PL is higher than the fifth predetermined power P5b, the power is distributed so that the engine power PEG is constantly supplied.

When the battery voltage Eb satisfies the relationship E2 <Eb≦E3, the power-distribution calculating unit 243 selects the table data shown in FIG. 8.

Here, when the table data corresponding to F or R is selected, the engine power PEG is not supplied when the running power PR is from zero to the first predetermined power P1. When the running power PR is from the first predetermined power P1 to the second predetermined power P2, the power is distributed so that the engine power PEG is supplied to the running unit 3 in proportion to the running power PR, and when the running power PR is higher than the second predetermined power P2, the power is distributed so that the engine power PEG is constantly supplied.

When the table data corresponding to N is selected, the engine power PEG is not supplied when the loading-and-unloading power PL is from zero to a fourth predetermined power P4a. When the loading-and-unloading power PL is from the fourth predetermined power P4a to a fifth predetermined power P5a, the power is distributed so that the engine power PEG is supplied to the loading-and-unloading unit 5 in proportion to the loading-and-unloading power PL; and when the loading-and-unloading power PL is higher than the fifth predetermined power P5a, the power is distributed so that the engine power PEG is constantly supplied.

When the battery voltage Eb satisfies the relationship E3 <Eb≦E4, the power-distribution calculating unit 243 selects the table data shown in FIG. 9. The table data shown in FIG. 9 is similar to the table data described in the second embodiment, and a description thereof will be omitted.

Then, the power-distribution calculating unit 243 calculates the distribution of the engine power PEG, the first-motor power PM1, and the second-motor power PM2 based on the selected table data.

The table data shown in FIGS. 7 to 9 is used to change the power distribution according to the value of the running velocity V when the clutch-pedal switch signal 53 is F or R. The specific power distribution is the same as that of the second embodiment, and the description thereof will be omitted.

According to the above configuration, by increasing the distribution of the engine power PEG when the battery voltage Eb is low, it is possible to reduce the consumption amount of the battery 37.

Moreover, when the loads of the running power PR and loading-and-unloading power PL are low, by rotationally driving the first motor 9 or the second motor 11 using part of the engine power PEG, electrical power is generated, and the battery 37 is charged, thus allowing the consumption amount of the battery 37 to be further reduced.

What is claimed is:

1. An industrial vehicle comprising:
an engine configured to supply power to one of a running unit for running and a loading-and-unloading unit for loading and unloading;
a first motor configured to selectively supply power to one of the running unit and the loading-and-unloading unit;
a second motor configured to supply power to the running unit;
a required-power calculating unit configured to calculate running power required by the running unit, and loading-and-unloading power required by the loading-and-unloading unit;
a clutch unit configured to control the power transmitted from both the engine and the first motor to the running unit; and
a power-distribution calculating unit configured to select either the running unit or the loading-and-unloading unit as a destination to be supplied with power from the engine and the first motor based on the control status of the clutch unit and to calculate a distribution of power which the engine, the first motor, and the second motor supply based on the calculated running power and loading-and-unloading power,
wherein the power-distribution calculating unit calculates a distribution of power to be supplied from the engine, the first motor, and the second motor to the running unit based on the calculated running power in a case where the running unit is selected as the destination, and
wherein the power-distribution calculating unit calculates a distribution of power to be supplied from the engine and the first motor to the loading-and-unloading unit based on the calculated loading-and-unloading power in a case where the loading-and-unloading unit is selected as the destination.

2. An industrial vehicle according to claim 1, wherein a plurality of sets of table data are provided in the power-distribution calculating unit, wherein the destination to be supplied with power from the engine and power from the first motor is selected based on a control status of the clutch unit, and the distribution of power which the engine supplies, power which the first motor supplies, and power which the second motor supplies is defined based on the calculated running power and loading-and-unloading power; and the table data used for distributing the power is changed based on the control status of the clutch unit.

3. An industrial vehicle according to claim 2, further comprising:

a velocity detection unit configured to detect a running velocity, wherein the plurality of sets of table data determine the distribution of the power which the engine supplies, the power which the first motor supplies, and the power which the second motor supplies also based on an output of the velocity detection unit.

4. An industrial vehicle according to claim 2, further comprising:

a battery configured to supply electrical power to a running motor and a loading-and-unloading motor; and a voltage detection unit configured to detect a voltage of the battery, wherein the plurality sets of table data determine the distribution of the power which the engine supplies, the power which the first motor supplies, and the power which the second motor supplies also based on an output of the voltage detection unit.

5. A power control method for an industrial vehicle, comprising:

providing an engine that supplies power to a running unit for running and a loading unit for loading and unloading;

providing a clutch unit configured to control the power transmitted from the engine to the running unit;

providing a first motor that selectively supplies power to one of the running unit and the loading-and-unloading unit;

providing a second motor configured to supply power to the running unit;

a required power calculating step of calculating, based on an operation by an operator, running power required by the running unit for running and loading-and-unloading power required by the loading-and-unloading unit for loading and unloading;

a selecting step of selecting either the running unit or the loading-and-unloading unit as a destination to be supplied with power from the engine and the first motor based on a control status of power transmitted from the engine to the running unit; and a power distribution calculating step of calculating a distribution of power which the engine, the first motor, and the second motor supply based on the calculated running power and loading-and-unloading power, wherein the power-distribution calculating step calculates a distribution of power to be supplied from the engine, the first motor, and the second motor to the running unit based on the calculated running power in a case where the running unit is selected as the destination, and the power-distribution calculating step calculates a distribution of power to be supplied from the engine and the first motor to the loading-and-unloading unit based on the calculated loading-and-unloading power in a case where the loading-and-unloading unit is elected as the destination.

* * * * *